(12) United States Patent
Park et al.

(10) Patent No.: US 8,734,994 B2
(45) Date of Patent: May 27, 2014

(54) CATHODE ACTIVE MATERIAL, CATHODE INCLUDING THE SAME, AND LITHIUM BATTERY INCLUDING CATHODE

(75) Inventors: Min-sik Park, Suwon-si (KR); Jae-gu Yoon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 633 days.

(21) Appl. No.: 12/985,689

(22) Filed: Jan. 6, 2011

(65) Prior Publication Data

US 2011/0226985 A1    Sep. 22, 2011

(30) Foreign Application Priority Data

Mar. 19, 2010    (KR) .................. 10-2010-0024762

(51) Int. Cl.
*H01M 4/131* (2010.01)

(52) U.S. Cl.
USPC .......... 429/231.1; 252/182.1; 429/218.1; 429/223; 429/224; 429/231.3; 429/231.5; 429/231.95

(58) Field of Classification Search
USPC ......... 252/182.1; 429/223, 224, 231.1, 218.1, 429/231.3, 231.5, 231.95
See application file for complete search history.

(56) References Cited

U.S. PATENT DOCUMENTS

| 2003/0129495 A1* | 7/2003 | Yamato et al. ............. 429/231.1 |
| 2006/0099508 A1* | 5/2006 | Thackeray et al. ......... 429/231.1 |
| 2006/0188781 A1 | 8/2006 | Thackeray et al. |
| 2007/0218359 A1* | 9/2007 | Shimizu et al. .............. 429/223 |
| 2009/0220859 A1 | 9/2009 | Yoon et al. |

FOREIGN PATENT DOCUMENTS

| KR | 10-2004-0028322 A | 4/2004 |
| KR | 10-2005-0096019 A | 10/2005 |
| KR | 10-2008-0054708 | 6/2008 |
| KR | 10-2009-0093165 A | 9/2009 |

* cited by examiner

*Primary Examiner* — Mark Kopec
*Assistant Examiner* — Haidung Nguyen
(74) *Attorney, Agent, or Firm* — Cantor Colburn LLP

(57) ABSTRACT

A cathode active material including a lithium metal oxide represented by Formula 1 below:

$$\text{Li}[\text{Li}_x\text{Me}_y\text{M}'_z]\text{O}_{2+d} \quad \text{Formula 1}$$

wherein $x+y+z=1$, $0<x<0.33$, $0.05 \leq z \leq 0.15$, $0 \leq d \leq 0.1$, Me includes at least one metal selected from the group consisting of manganese (Mn), vanadium (V), chromium (Cr), iron (Fe), cobalt (Co), nickel (Ni), aluminum (Al), and boron (B), and M' includes at least one metal selected from the group consisting of germanium (Ge), ruthenium (Ru), tin (Sn), titanium (Ti), niobium (Nb), and platinum (Pt).

15 Claims, 3 Drawing Sheets

CATHODE ACTIVE MATERIAL, CATHODE INCLUDING THE SAME, AND LITHIUM BATTERY INCLUDING CATHODE

CROSS-REFERENCE TO RELATED APPLICATION

This application claims the benefit of Korean Patent Application No. 10-2010-0024762, filed on Mar. 19, 2010 in the Korean Intellectual Property Office, the disclosure of which is incorporated herein by reference.

BACKGROUND

1. Field

Aspects of the present disclosure relate to cathode active materials, cathodes including the same, and lithium batteries including the cathodes.

2. Description of the Related Art

As cathode active materials for a lithium battery, transition metal compounds such as $LiNiO_2$, $LiCoO_2$, $LiMn_2O_4$, $LiFePO_4$, $LiNi_xCo_{1-x}O_2$, where $0 \leq x \leq 1$, and $LiNi_{1-x-y}Co_xM-n_yO_2$, where $0 \leq x \leq 0.5$ and $0 \leq y \leq 0.5$, and oxides of these transition metal compounds and lithium are used.

$LiCoO_2$ is relatively expensive, and has a limited electric capacity, i.e., an electric capacity of about 140 mAh/g. In $LiCoO_2$, when the charging voltage increases up to 4.2 V or greater, 50% or more of lithium is removed, and thus $LiCoO_2$ exists in the form of $Li_{1-x}CoO_2$ where $x > 0.5$. Oxides in the form of $Li_{1-x}CoO_2$, where $x > 0.5$, are structurally unstable, and the electric capacity thereof is rapidly decreased during charging and discharging cycles.

A cathode active material such as $LiNi_xCo_{1-x}O_2$, where $0 \leq x \leq 1$, or $LiNi_{1-x-y}Co_xMn_yO_2$, where $0 \leq x \leq 0.5$ and $0 \leq y \leq 0.5$, has poor swelling inhibition properties at high temperatures.

A lithium metal oxide in the form of $Li[Li_xM'_{1-x}]O_2$, where $x > 0$ and M' represents a plurality of transition metals, has an increased electric capacity, i.e., 250~280 mAh/g. However, such a lithium metal oxide including an excessive amount of lithium has poor cycle properties and poor stability at high temperatures.

SUMMARY

Aspects of the present invention provide cathode active materials that are substituted with hetero-elements.

One or more embodiments include cathodes including the cathode active materials.

One or more embodiments of the present invention include lithium batteries including the cathodes.

According to an aspect of the present invention, a cathode active material includes a lithium metal oxide represented by Formula 1 below:

$$Li[Li_xMe_yM'_z]O_{2+d} \qquad \text{Formula 1}$$

wherein $x+y+z=1$, $0<x<0.33$, $0.05 \leq z \leq 0.15$, $0 \leq d \leq 0.1$,

Me comprises at least one metal selected from the group consisting of manganese (Mn), vanadium (V), chromium (Cr), iron (Fe), cobalt (Co), nickel (Ni), aluminum (Al), and boron (B), and M' comprises at least one metal selected from the group consisting of germanium (Ge), ruthenium (Ru), tin (Sn), titanium (Ti), niobium (Nb), and platinum (Pt)

According to another aspect of the present invention, a cathode includes the cathode active material described above.

According to another aspect of the present invention, a lithium battery includes the cathode described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
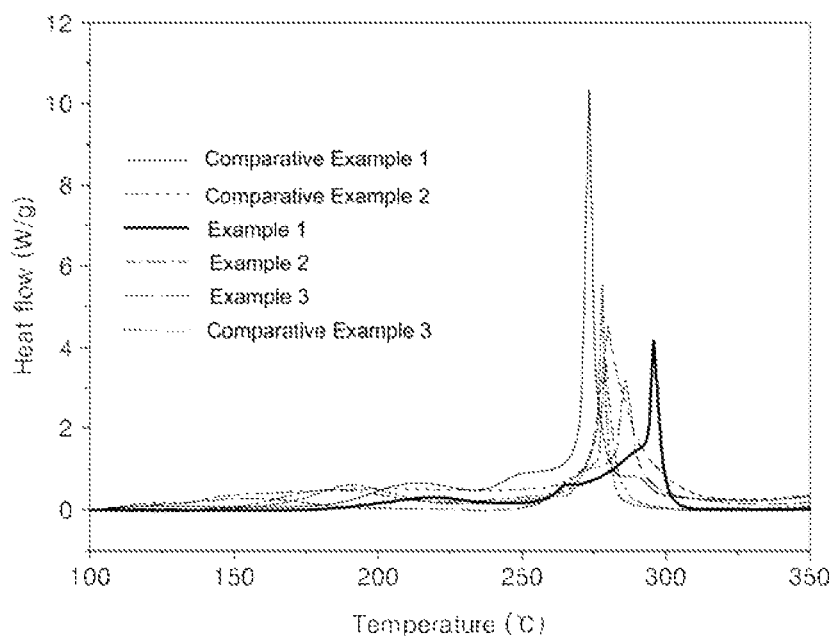
FIG. 1 is a graph showing differential scanning calorimeter (DSC) measurement results of cathode active materials prepared according to Examples 1 through 3 and Comparative Examples 1 through 3.
Figure 2:
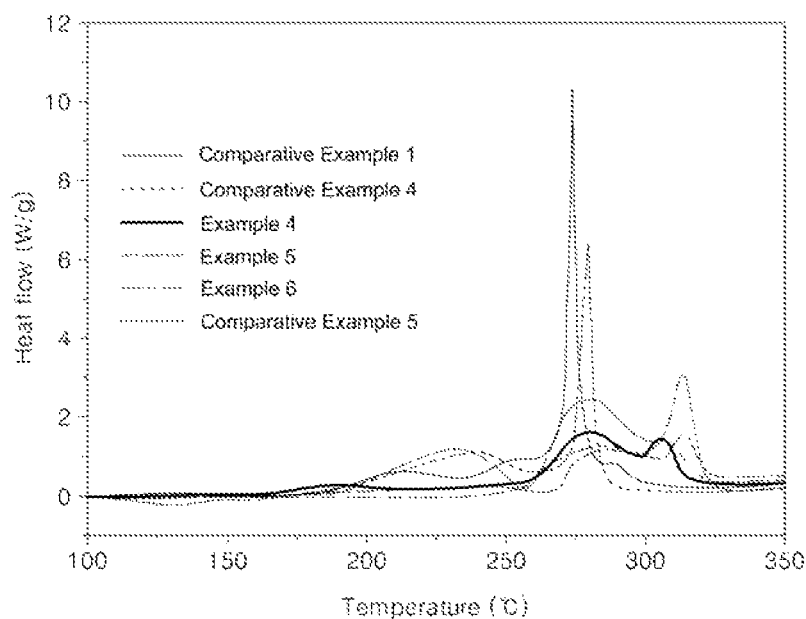
FIG. 2 is a graph showing DSC measurement results of cathode active materials prepared according to Examples 4 through 6 and Comparative Examples 1, 4 and 5.
Figure 3:
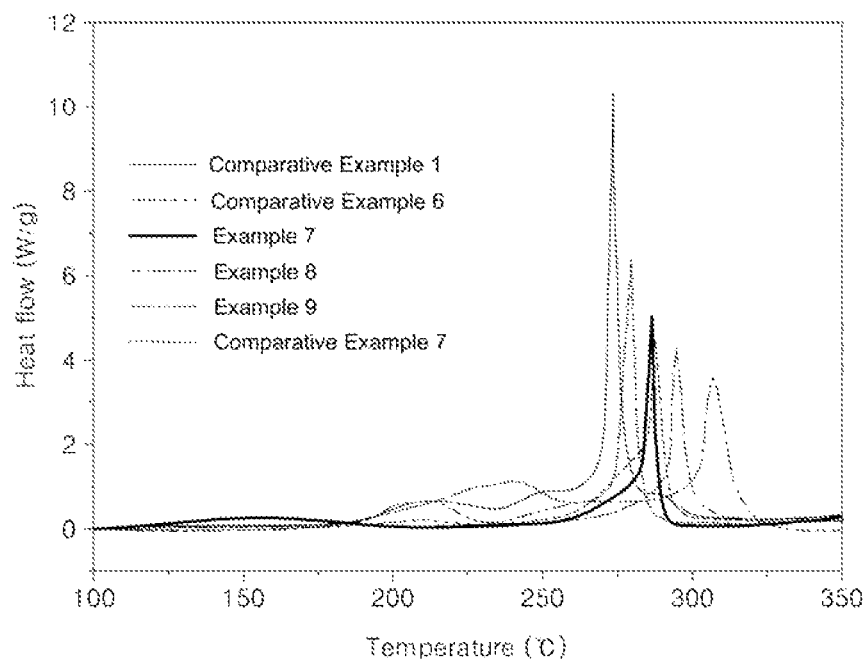
FIG. 3 is a graph showing DSC measurement results of cathode active materials prepared according to Examples 7 through 9 and Comparative Examples 1, 6 and 7.
Figure 4:
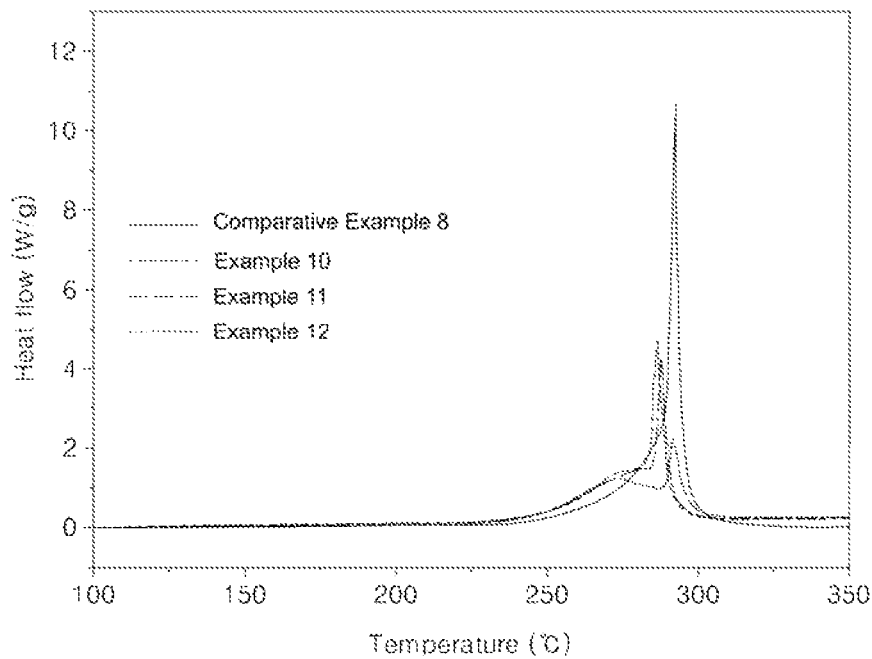
FIG. 4 is a graph showing DSC measurement results of cathode active materials prepared according to Examples 10 through 12 and Comparative Example 8.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Hereinafter, one or more embodiments of a cathode active material, a cathode including the cathode active material, and a lithium battery including the cathode will be described in detail.

A cathode active material according to an embodiment of the present invention includes a lithium metal oxide represented by Formula 1 below:

$$Li[Li_xMe_yM'_z]O_{2+d} \qquad \text{Formula 1}$$

wherein $x+y+z=1$, $0<x<0.33$, $0.05 \leq z \leq 0.15$, $0 \leq d \leq 0.1$, Me is at least one metal selected from the group consisting of manganese (Mn), vanadium (V), chromium (Cr), iron (Fe), cobalt (Co), nickel (Ni), aluminum (Al), and boron (B), and M' is at least one metal selected from the group consisting of germanium (Ge), ruthenium (Ru), tin (Sn), titanium (Ti), niobium (Nb), and platinum (Pt). In Formula 1, x may satisfy the condition of $0.03<x<0.17$ in one embodiment, although other embodiments can include the expanded range set forth above.

The lithium metal oxide is obtained such that an overlithiated lithium metal oxide including a metal (Me) is additionally doped with a new metal (M'), and a lithium battery including the lithium metal oxide has enhanced high-temperature cycle characteristics and enhanced high-temperature stability.

For example, due to the additional doping of M', some of Me included in a $Li_2MeO_3$ phase supposed to be included in the lithium metal oxide of Formula 1 is substituted with a hetero-element, and thus the structural stability of the lithium metal oxide of Formula 1 may increase.

A doping amount of M' may be in the range of about 5 to about 15 mol % based on the total moles of excess lithium and the metals. For this, z in Formula 1 satisfies the condition of $0.05 \leq z \leq 0.15$. When the doping amount of M' is within this range, a lithium battery may have enhanced high-temperature cycle characteristics and enhanced high-temperature stability. When z is beyond this range, the reversible capacity of a lithium battery may decrease and high-temperature cycle characteristics and high-temperature stability of the lithium battery may deteriorate. Me may include a number of metals.

Some of M' in the cathode active material (lithium metal oxide of Formula 1) may be substituted with molybdenum (Mo). For example, the lithium metal oxide included in the cathode active material may be represented by Formula 2 below:

$$Li[Li_xMe_yM'_{z-w}Mo_w]O_{2+d} \quad \text{Formula 2}$$

wherein $x+y+z=1$, $0<x<0.33$, $0.05 \leq z=0.15$, $0.01 \leq w \leq 0.10$, $0 \leq d \leq 0.1$, Me includes at least one metal selected from the group consisting of Mn, V, Cr, Fe, Co, Ni, Al, and B, and M' includes at least one metal selected from the group consisting of Ge, Ru, Sn, Ti, Nb, and Pt. In formula 2, z and w satisfy the condition of $z-w>0$.

The lithium metal oxide of Formula 1 may include Mn and at least one metal selected from the group consisting of V, Cr, Fe, Co, Ni, Al, and B. That is, Me may essentially include Mn, and further include the at least one metal. The amount of Mn may be in the range of about 20 to about 50 mol % based on the total moles of $[Li_xMe_yM'_z]$ in the lithium metal oxide of Formula 1. That is, the amount of Mn may be in the range of about 20 to about 50 mol % based on the total moles of the excess lithium, Me, and M'.

The lithium metal oxide included in the cathode active material may be represented by Formula 3 below:

$$Li[Li_xMe_yM''_z]O_{2+d} \quad \text{Formula 3}$$

wherein $x+y+z=1$, $0<x<0.33$, $0.05 \leq z \leq 0.15$, $0 \leq d \leq 0.1$, Me includes at least one metal selected from the group consisting of Mn, V, Cr, Fe, Co, Ni, Al, and B, and M'' is Ru, Sn, or Ti.

Some of M'' in the lithium metal oxide of Formula 3 may be substituted with Mo. For example, the lithium metal oxide included in the cathode active material may be represented by Formula 4 below:

$$Li[Li_xMe_yM''_{z-w}Mo_w]O_{2+d} \quad \text{Formula 4}$$

wherein $x+y+z=1$, $0<x<0.33$, $0.05 \leq z \leq 0.15$, $0.01 \leq w \leq 0.10$, $0 \leq d \leq 0.1$, Me includes at least one metal selected from the group consisting of Mn, V, Cr, Fe, Co, Ni, Al, and B, and M'' is Ru, Sn, or Ti.

In the lithium metal oxide of Formula 3, Me may include Mn and at least one metal selected from the group consisting of V, Cr, Fe, Co, Ni, Al, and B. That is, Me may essentially include Mn, and further include the at least one metal. The amount of Mn may be in the range of about 20 to about 50 mol % based on the total molar number of $[Li_xMe_yM''_z]$ in the lithium metal oxide of Formula 3. That is, the amount of Mn may be in the range of about 20 to about 50 mol % based on the total molar number of the excess lithium, Me, and M''.

The lithium metal oxide included in the cathode active material may be represented by Formula 5 below:

$$Li[Li_xNi_aCo_bMn_cM'_z]O_{2+d} \quad \text{Formula 5}$$

wherein $x+a+b+c+z=1$, $0<x<0.33$, $0.05 \leq z \leq 0.15$, $0<a \leq 0.5$, $0<b \leq 0.5$, $0.2 \leq c \leq 0.5$, $0 \leq d \leq 0.1$, and M' includes at least one selected from the group consisting of Ge, Ru, Sn, Ti, Nb, and Pt.

Some of M' in the lithium metal oxide of Formula 5 may be substituted with Mo. For example, the lithium metal oxide may be represented by Formula 6 below:

$$Li[Li_xNi_aCo_bMn_cM'_{z-w}Mo_w]O_{2+d} \quad \text{Formula 6}$$

wherein $x+a+b+c+z=1$, $0<x<0.33$, $0.05 \leq z \leq 0.15$, $0<a \leq 0.5$, $0<b \leq 0.5$, $0.2 \leq c \leq 0.5$, $0.01 \leq w \leq 0.10$, $0 \leq d \leq 0.1$, and M' includes at least one selected from the group consisting of Ge, Ru, Sn, Ti, Nb, and Pt.

For example, the lithium metal oxide included in the cathode active material may be represented by one of Formulae 7 through 9 below:

$$Li[Li_xNi_aCo_bMn_cRu_z]O_{2+d} \quad \text{Formula 7}$$

$$Li[Li_xNi_aCo_bMn_cSn_z]O_{2+d} \quad \text{Formula 8}$$

$$Li[Li_xNi_aCo_bMn_cTi_z]O_{2+d} \quad \text{Formula 9}$$

wherein x, a, b, c, z, and d satisfy the conditions of $x+a+b+c+z=1$, $0<x<0.33$, $0.05 \leq z \leq 0.15$, $0<a \leq 0.5$, $0<b \leq 0.5$, $0.2 \leq c \leq 0.5$, and $0 \leq d \leq 0.1$.

In the lithium metal oxide represented by one of Formulae 7 through 9, some of M' may be substituted with Mo. For example, the lithium metal oxide may be represented by one of Formulae 10 through 12:

$$Li[Li_xNi_aCo_bMn_cRu_{z-w}Mo_w]O_{2+d} \quad \text{Formula 10}$$

$$Li[Li_xNi_aCo_bMn_cSn_{z-w}Mo_w]O_{2+d} \quad \text{Formula 11}$$

$$Li[Li_xNi_aCo_bMn_cTi_{z-w}Mo_w]O_{2+d} \quad \text{Formula 12}$$

wherein x, a, b, c, z, w, and d satisfy the conditions of $x+a+b+c+z=1$, $0<x<0.33$, $0.05 \leq z \leq 0.15$, $0<a \leq 0.5$, $0<b \leq 0.5$, $0.2 \leq c \leq 0.5$, $0.01 \leq w \leq 0.10$, and $0 \leq d \leq 0.1$.

A method of preparing the lithium metal oxide, according to another embodiment of the present invention, includes: mixing metal precursors, a dilute nitric acid, an aqueous citric acid solution, and ethylene glycol to prepare a sol; heating the sol to form a gel and thermally decomposing the gel; and heat-treating the thermally decomposed gel.

The metal precursors include precursors of lithium and the other metals that constitute the lithium metal oxide. The type of the metal precursor is not particularly limited, and the metal precursor is generally in the form of a metal-containing salt, a complex in which the metals described above are coordinated with an organic ligand, or the like.

The amount of each metal precursor according to the type of the metals constituting the lithium metal oxide may be appropriately selected considering the composition of the lithium metal oxide. The metal precursor may include a first metal precursor including at least one metal selected from the group consisting of Mn, V, Cr, Fe, Co, Ni, Al, and B; a second metal precursor including at least one metal selected from the group consisting of Ge, Ru, Sn, Ti, Nb, and Pt; and a lithium metal precursor. For example, the first metal precursor may be nickel acetate, cobalt acetate, or manganese acetate. For example, the second metal precursor may be ruthenium acetylacetonate, tin chloride, or titanium isopropoxide. For example, the lithium metal precursor may be lithium carbonate.

The citric acid acts as a chelating agent. The ethylene glycol is gelled, thereby acting as a matrix. The concentration of the dilute nitric acid may be in the range of about 0.01 to about 10 wt %. The mixing ratio of the metal precursor, the dilute nitric acid, the aqueous citric acid solution, and ethylene glycol may be appropriately selected according to conditions.

In the heating of the sol to form a gel and the thermal decomposing of the gel, a phase change occurs when a reactor containing the sol is continuously heated. That is, when the reactor containing the sol is heated, the sol is converted to the gel, and all the water then evaporates and residues are thermally decomposed. In the thermal decomposing process, the heating process may be performed at a temperature in the range of about 300 to about 500° C. for about 1 to about 5 hours; however, it is not limited thereto. That is, the heating conditions may be appropriately selected. The heat-treating of the thermally decomposed gel may be performed at a temperature in the range of about 850 to about 1100° C. for about 3 to about 12 hours in a dried air atmosphere; however, it is not limited thereto. That is, the heat-treating conditions may be appropriately selected. The heat-treated resultant of thermally-decomposed gel may be dried and cooled in a furnace.

Alternatively, the method of preparing the lithium metal oxide includes: preparing a first aqueous solution containing a first metal precursor; preparing a second aqueous solution containing a lithium metal precursor and acetic acid; adding a second metal precursor and citric acid to the second aqueous solution to prepare a third aqueous solution; adding an aqueous oxalic acid solution to a mixed solution of the first and third aqueous solutions to obtain a precipitate; removing moisture from the precipitate and thermally decomposing the precipitate; and heat-treating the thermally decomposed precipitate.

The first metal precursor may be a precursor containing at least one transition metal selected from the group consisting of Mn, V, Cr, Fe, Co, Ni, Al, and B. The lithium metal precursor may be a precursor of a lithium metal. The second metal precursor may be a precursor containing at least one transition metal selected from the group consisting of Ge, Ru, Sn, Ti, Nb, and Pt.

For example, the first metal precursor may be nickel acetate, cobalt acetate, or manganese acetate. For example, the second metal precursor may be ruthenium acetylacetonate, tin chloride, or titanium isopropoxide. For example, the lithium metal precursor may be lithium carbonate.

The acetic acid uniformly dissolves the metal precursor. The oxalic acid acts as a precipitant. The citric acid acts as a chelating agent. The mixing ratio of the metal precursor to acetic acid or citric acid in each aqueous solution may be appropriately selected depending on conditions. The concentration of the aqueous oxalic acid solution may also be appropriately selected depending on conditions. In addition, the mixing ratio of the first, second and third aqueous solutions may be appropriately selected depending on conditions.

The thermal decomposing of the precipitate may be performed at a temperature in the range of about 300 to about 500° C. for about 1 to about 5 hours; however, it is not limited thereto. That is, the heat-treating conditions may be appropriately selected. The heat-treating of the thermally decomposed precipitate may be performed at a temperature in the range of about 850 to about 1100° C. for about 3 to about 12 hours in a dried air atmosphere; however, it is not limited thereto. That is, the heat-treating conditions may be appropriately selected. The heat-treated thermally decomposed precipitate may be dried and cooled in a furnace.

A cathode according to another embodiment of the present invention includes the cathode active material described above. For example, the cathode may be manufactured by molding a cathode active material composition including the cathode active material and a binder into a desired shape, or coating the cathode active material composition on a current collector such as copper foil, an aluminum foil, or the like.

In particular, the cathode active material, a conducting agent, a binder, and a solvent are mixed to prepare the cathode active material composition. The cathode active material composition may be directly coated on a metallic current collector to prepare a cathode plate. Alternatively, the cathode active material composition may be cast on a separate support to form a cathode active material film, and then the cathode active material film may be separated from the support and laminated on a metallic current collector to prepare a cathode plate. The cathode is not limited to the examples described above, and may be in other forms.

The conducting agent may be carbon black or graphite particulates, but is not limited thereto. Any material available as a conducting agent in the art may be used.

Examples of the binder include a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer, but are not limited thereto. Any material available as a binder in the art may be used.

Examples of the solvent include N-methyl-pyrrolidone, acetone, and water, but are not limited thereto. Any material available as a solvent in the art may be used.

The amounts of the cathode active material, the conducting agent, the binder, and the solvent used in the manufacture of the lithium battery are those levels that are generally used in the art. At least one of the conducting agent, the binder or the solvent may be omitted according to the use and the structure of the lithium battery.

A lithium battery according to another embodiment of the present invention includes the cathode including the cathode active material. The lithium battery may be manufactured in the following manner. First, a cathode is manufactured using the manufacturing method of the cathode described above.

Next, an anode active material, a conducting agent, a binder, and a solvent are mixed to prepare an anode active material composition. The anode active material composition is directly coated on a metallic current collector and dried to prepare an anode plate. Alternatively, the anode active material composition may be cast on a separate support to form an anode active material film, and then the anode active material film, which is separated from the support, may be laminated on a metallic current collector to prepare an anode plate.

The anode active material is a compound capable of intercalating/deintercalating lithium. Any material available as an anode active material in the art may be used. Examples of the anode active material include, but are not limited to, a lithium metal, a lithium alloy, a carbonaceous material, graphite, and a mixture thereof.

The conducting agent, the binder and the solvent used for the anode active material composition may be the same as those used for the cathode active material composition. Alternatively, a plasticizer may be further added into the cathode active material composition and/or the anode active material composition to form pores in the electrode plates.

The amounts of the anode active material, the conducting agent, the binder, and the solvent are levels that are generally used for manufacturing a lithium battery. At least one of the conducting agent, the binder or the solvent may be omitted, depending on the use and the structure of the lithium battery.

Next, a separator to be disposed between the cathode and the anode is prepared. The separator may be any separator that is commonly used for lithium batteries. The separator may have low resistance to migration of ions in an electrolyte and have an excellent electrolyte-retaining ability. Examples of the separator may include glass fiber, polyester, polyethylene, polypropylene, polytetrafluoroethylene (PTFE), and a combination thereof, each of which may be a non-woven or woven fabric. For example, a windable separator including polyethylene or polypropylene may be used for a lithium ion battery. A separator with excellent organic electrolytic solution-retaining capability may be used for a lithium ion polymer battery. For example, the separator may be manufactured in the following manner.

A polymer resin, a filler, and a solvent are mixed to prepare a separator composition. Then, the separator composition may be directly coated on an electrode, and then dried to form the separator. Alternatively, the separator composition may be cast on a support and then dried to form a separator film, and the separator film, which is separated from the support, may be laminated on an electrode to form the separator.

The polymer resin that may be used to manufacture the separator may be any material that is commonly used as a binder for electrode plates. Examples of the polymer resin include a vinylidenefluoride/hexafluoropropylene copolymer, polyvinylidene fluoride (PVDF), polyacrylonitrile, polymethylmethacrylate and a mixture thereof.

Next, an electrolyte is prepared. For example, the electrolyte may be an organic electrolytic solution. Alternately, the electrolyte may be in a solid phase. For example, the electrolyte may be boron oxide or lithium oxynitride, but is not limited thereto. Any material available as a solid electrolyte in the art may be used. The solid electrolyte may be formed on the anode by sputtering.

For example, the organic electrolytic solution may be prepared. The organic electrolytic solution may be prepared by dissolving a lithium salt in an organic solvent.

The organic solvent may be any solvent available as an organic solvent in the art. Examples of the organic solvent include propylene carbonate, ethylene carbonate, fluoroethylene carbonate, butylene carbonate, dimethyl carbonate, diethyl carbonate, ethylmethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, 1,3-dioxolane, 4-methyl-1,3-dioxolane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, and mixtures thereof.

The lithium salt may be any material available as a lithium salt in the art. Examples of the lithium salt include $LiPF_6$, $LiBF_4$, $LiSbF_6$, $LiAsF_6$, $LiClO_4$, $LiCF_3SO_3$, $LiN(CF_3SO_2)_2$, $LiC_4F_9SO_3$, $LiAlO_2$, $LiAlCl_4$, $LiN(C_xF_{2x+1}SO_2)(C_yF_{2y+1}SO_2)$ where x and y are each independently a natural number, LiCl, LiI and a mixture thereof.

Figure 5:
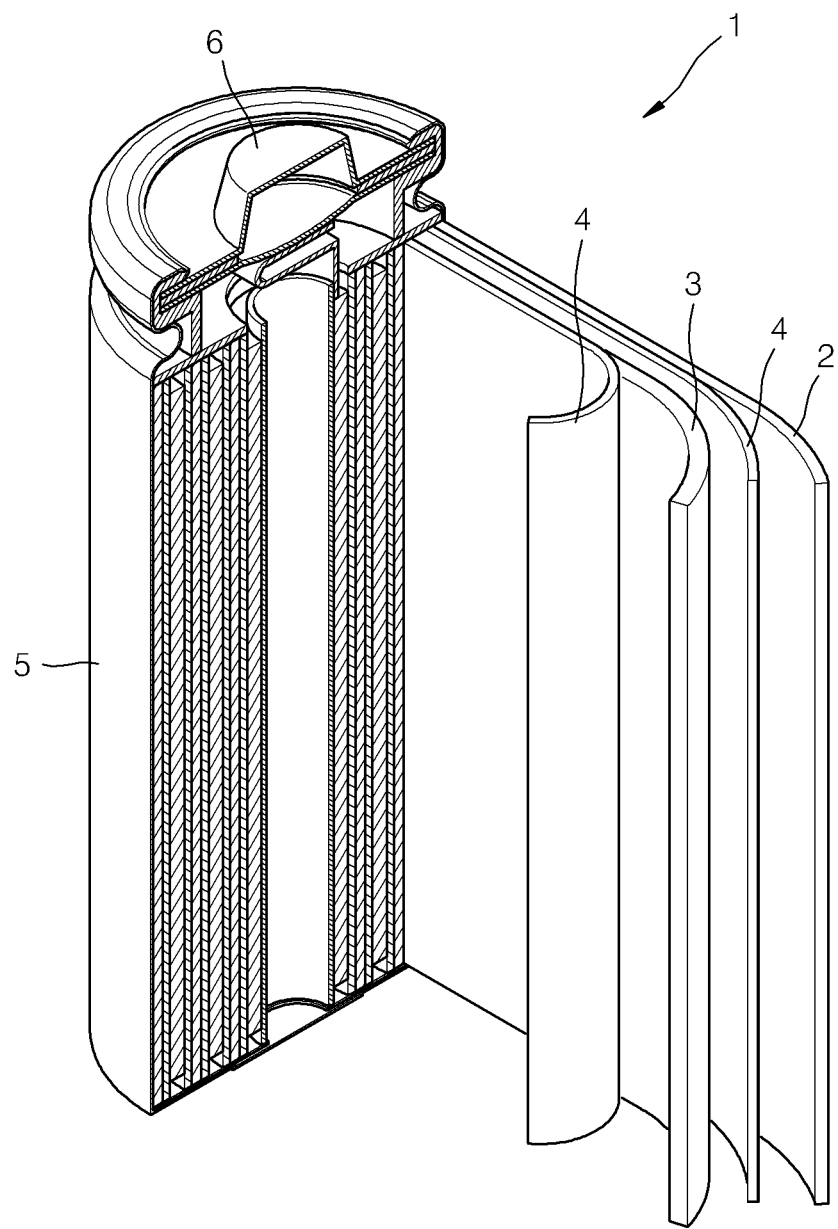
FIG. 5 is a schematic view of a lithium battery according to an embodiment of the present invention.

Referring to FIG. 5, a lithium battery 1 includes a cathode 3, an anode 2, and a separator 4. The cathode 3, the anode 2 and the separator 4 are rolled up or folded, and then sealed in a battery case 5. Then, the battery case 5 is filled with an organic electrolytic solution and sealed with a cap assembly 6, thereby completing the manufacture of the lithium battery 1. The battery case 5 may be a cylindrical type, a rectangular type, or a thin-film type. For example, the lithium battery may be a thin-film type battery. The lithium battery may be a lithium ion battery.

The separator 4 may be interposed between the cathode 3 and the anode 2 to form a battery assembly. If the lithium battery 1 is a lithium ion polymer battery, a plurality of the battery assemblies may be stacked in a bi-cell structure and impregnated with the organic electrolytic solution. The resultant is put into a pouch and hermetically sealed, thereby completing the manufacture of a lithium ion polymer battery.

In addition, a plurality of battery assemblies may be stacked to form a battery pack, which may be used in any device that operates at high temperatures and requires high power output, for example, in a laptop computer, a smart phone, electric vehicle, and the like. In particular, the lithium battery has excellent high-temperature cycle characteristics and high-temperature stability, and thus it is suitable for use in electric vehicles (EV). For example, the lithium battery is suitable for use in hybrid vehicles such as plug-in hybrid electric vehicles (PHEV).

Hereinafter, embodiments of the present invention will be described in detail with reference to the following examples. However, these examples are not intended to limit the scope of the embodiments of the present invention.

Preparation of Cathode Active Material

Example 1

Preparation of $Li[Li_{0.1}Ni_{0.35}Co_{0.14}Mn_{0.35}Ru_{0.06}]O_2$

Lithium carbonate, nickel acetate, cobalt acetate, manganese acetate, and ruthenium acetylacetonate were selected as starting materials. The starting materials were selected by calculating a molar ratio of Li, Ni, Co, Mn and Ru to prepare 0.03 mol of $Li[Li_{0.1}Ni_{0.35}CO_{0.14}Mn_{0.35}Ru_{0.06}]O_2$.

The starting materials were dissolved in 50 ml of an aqueous dilute nitric acid solution prepared by mixing 5 g of 60 wt % nitric acid and 50 ml of distilled water, and 50 ml of a 2M aqueous citric acid solution and 30 ml of ethylene glycol were added to the resulting solution to prepare a sol. The sol was heated to evaporate water therefrom, thereby forming a gel, and the gel was thermally decomposed at 500° C. for 5 hours in an air atmosphere. The thermally decomposed gel was put in a furnace, and heat-treated at 1000° C. for 5 hours in a dried air atmosphere to prepare a cathode active material. The cathode active material was cooled in the furnace.

Example 2

Preparation of $Li[Li_{0.1}Ni_{0.35}Co_{0.14}Mn_{0.31}Ru_{0.10}]O_2$

A cathode active material was prepared in the same manner as in Example 1, except that the starting materials were selected at a different molar ratio of Li, Ni, Co, Mn and Ru to prepare 0.03 mol of $Li[Li_{0.1}Ni_{0.35}Co_{0.14}Mn_{0.31}Ru_{0.10}]O_2$.

Example 3

Preparation of $Li[Li_{0.1}Ni_{0.35}Co_{0.14}Mn_{0.27}Ru_{0.14}]O_2$

A cathode active material was prepared in the same manner as in Example 1, except that the starting materials were selected at a different molar ratio of Li, Ni, Co, Mn and Ru to prepare 0.03 mol of $Li[Li_{0.1}Ni_{0.35}CO_{0.14}Mn_{0.27}Ru_{0.14}]O_2$.

Example 4

Preparation of $Li[Li_{0.1}Ni_{0.35}Co_{0.14}Mn_{0.35}Sn_{0.06}]O_2$

Lithium carbonate, nickel acetate, cobalt acetate, manganese acetate, and tin chloride were selected as starting materials. The starting materials were selected by calculating a molar ratio of Li, Ni, Co, Mn and Sn to prepare 0.03 mol of $Li[Li_{0.1}Ni_{0.35}Co_{0.14}Mn_{0.35}Sn_{0.06}]O_2$.

The starting materials were dissolved in 50 ml of an aqueous dilute nitric acid solution prepared by mixing 5 g of 60 wt % nitric acid and 50 ml of distilled water, and 50 ml of a 2M aqueous citric acid solution and 30 ml of ethylene glycol were added to the resulting solution to prepare a sol. The sol was heated to evaporate water therefrom, thereby forming a gel, and the gel was thermally decomposed at 500° C. for 5 hours in an air atmosphere. The thermally decomposed gel was put in a furnace, and heat-treated at 1000° C. for 5 hours in a dried air atmosphere to prepare a cathode active material. The cathode active material was cooled in the furnace.

Example 5

Preparation of $Li[Li_{0.1}Ni_{0.35}Co_{0.14}Mn_{0.31}Sn_{0.10}]O_2$

A cathode active material was prepared in the same manner as in Example 4, except that the starting materials were selected at a different molar ratio of Li, Ni, Co, Mn and Sn to prepare 0.03 mol of $Li[Li_{0.1}Ni_{0.35}Co_{0.14}Mn_{0.31}Sn_{0.10}]O_2$.

Example 6

Preparation of $Li[Li_{0.1}Ni_{0.35}Co_{0.14}Mn_{0.27}Sn_{0.14}]O_2$

A cathode active material was prepared in the same manner as in Example 4, except that the starting materials were selected at a different molar ratio of Li, Ni, Co, Mn and Sn to prepare 0.03 mol of $Li[Li_{0.1}Ni_{0.35}Co_{0.14}Mn_{0.27}Sn_{0.14}]O_2$.

Example 7

Preparation of $Li[Li_{0.1}Ni_{0.35}Co_{0.14}Mn_{0.35}Ti_{0.06}]O_2$

Lithium carbonate, nickel acetate, cobalt acetate, manganese acetate, and titanium isopropoxide were selected as starting materials. The starting materials were selected by calculating a molar ratio of Li, Ni, Co, Mn and Ti to prepare 0.03 mol of $Li[Li_{0.1}Ni_{0.35}Co_{0.14}Mn_{0.35}Ti_{0.06}]O_2$.

The starting materials were dissolved in 50 ml of an aqueous dilute nitric acid solution prepared by mixing 5 g of 60 wt % nitric acid and 50 ml of distilled water, and 50 ml of a 2M aqueous citric acid solution and 30 ml of ethylene glycol were added to the resulting solution to prepare a sol. The sol was heated to evaporate water therefrom, thereby forming a gel, and the gel was thermally decomposed at 500° C. for 5 hours in an air atmosphere. The thermally decomposed gel was put in a furnace, and heat-treated at 1000° C. for 5 hours in a dried air atmosphere to prepare a cathode active material. The cathode active material was cooled in the furnace.

Example 8

Preparation of $Li[Li_{0.1}Ni_{0.35}Co_{0.14}Mn_{0.31}Ti_{0.10}]O_2$

A cathode active material was prepared in the same manner as in Example 7, except that the starting materials were selected at a different molar ratio of Li, Ni, Co, Mn and Ti to prepare 0.03 mol of $Li[Li_{0.1}Ni_{0.35}Co_{0.14}Mn_{0.31}Ti_{0.10}]O_2$.

Example 9

Preparation of $Li[Li_{0.1}Ni_{0.35}Co_{0.14}Mn_{0.27}Ti_{0.14}]O_2$

A cathode active material was prepared in the same manner as in Example 7, except that the starting materials were selected at a different molar ratio of Li, Ni, Co, Mn and Ti to prepare 0.03 mol of $Li[Li_{0.1}Ni_{0.35}Co_{0.14}Mn_{0.27}Ti_{0.14}]O_2$.

Example 10

Preparation of $Li[Li_{0.1}Ni_{0.35}Co_{0.14}Mn_{0.31}Mo_{0.02}Ru_{0.08}]O_2$

Lithium carbonate, nickel acetate, cobalt acetate, manganese acetate, ammonium molybdate, and ruthenium acetylacetonate were selected as starting materials. The starting materials were selected by calculating a molar ratio of Li, Ni, Co, Mn, Mo and Ru to prepare 0.03 mol of $Li[Li_{0.1}Ni_{0.35}Co_{0.14}Mn_{0.31}Mo_{0.02}Ru_{0.08}]O_2$.

The starting materials were dissolved in 50 ml of an aqueous dilute nitric acid solution prepared by mixing 5 g of 60 wt % nitric acid and 50 ml of distilled water, and 50 ml of a 2M aqueous citric acid solution and 30 ml of ethylene glycol were added to the resulting solution to prepare a sol. The sol was heated to evaporate water therefrom, thereby forming a gel, and the gel was thermally decomposed at 500° C. for 5 hours in an air atmosphere. The thermally decomposed gel was put in a furnace, and heat-treated at 1000° C. for 5 hours in a dried air atmosphere to prepare a cathode active material. The cathode active material was cooled in the furnace.

Example 11

Preparation of $Li[Li_{0.1}Ni_{0.35}Co_{0.14}Mn_{0.31}Mo_{0.02}Sn_{0.08}]O_2$

A cathode active material was prepared in the same manner as in Example 10, except that tin chloride was used as a starting material instead of ruthenium acetylacetonate, and the starting materials were selected by calculating a molar ratio of Li, Ni, Co, Mn, Mo and Sn to prepare 0.03 mol of $Li[Li_{0.1}Ni_{0.35}Co_{0.14}Mn_{0.31}Mo_{0.02}Sn_{0.08}]O_2$.

Example 12

Preparation of $Li[Li_{0.1}Ni_{0.35}Co_{0.14}Mn_{0.31}Mo_{0.02}Ti_{0.08}]O_2$

A cathode active material was prepared in the same manner as in Example 10, except that titanium isopropoxide was used as a starting material instead of ruthenium acetylacetonate, and the starting materials were selected by calculating a molar ratio of Li, Ni, Co, Mn, Mo and Ti to prepare 0.03 mol of $Li[Li_{0.1}Ni_{0.35}Co_{0.14}Mn_{0.31}Mo_{0.02}Ti_{0.08}]O_2$.

Comparative Example 1

Preparation of $Li[Li_{0.1}Ni_{0.35}Co_{0.14}Mn_{0.41}]O_2$

Lithium carbonate, nickel acetate, cobalt acetate, and manganese acetate were selected as starting materials. The starting materials were selected by calculating a molar ratio of Li, Ni, Co and Mn to prepare 0.03 mol of $Li[Li_{0.1}Ni_{0.35}Co_{0.14}Mn_{0.41}]O_2$.

The starting materials were dissolved in 50 ml of an aqueous dilute nitric acid solution prepared by mixing 5 g of 60 wt % nitric acid and 50 ml of distilled water, and 50 ml of a 2M aqueous citric acid solution and 30 ml of ethylene glycol were added to the resulting solution to prepare a sol. The sol was heated to evaporate water therefrom, thereby forming a gel, and the gel was thermally decomposed at 500° C. for 5 hours in an air atmosphere. The thermally decomposed gel was put in a furnace, and heat-treated at 1000° C. for 5 hours in a dried air atmosphere to prepare a cathode active material. The cathode active material was cooled in the furnace.

Comparative Example 2

Preparation of Li[Li$_{0.1}$Ni$_{0.35}$Co$_{0.14}$Mn$_{0.39}$Ru$_{0.02}$]O$_2$

A cathode active material was prepared in the same manner as in Example 1, except that the starting materials were selected at a different molar ratio of Li, Ni, Co, Mn and Ru to prepare 0.03 mol of Li[Li$_{0.1}$Ni$_{0.35}$Co$_{0.14}$Mn$_{0.39}$Ru$_{0.02}$]O$_2$.

Comparative Example 3

Preparation of Li[Li$_{0.1}$Ni$_{0.35}$Co$_{0.14}$Mn$_{0.21}$Ru$_{0.020}$]O$_2$

A cathode active material was prepared in the same manner as in Example 1, except that the starting materials were selected at a different molar ratio of Li, Ni, Co, Mn and Ru to prepare 0.03 mol of Li[Li$_{0.1}$Ni$_{0.35}$Co$_{0.14}$Mn$_{0.21}$Ru$_{0.20}$]O$_2$.

Comparative Example 4

Preparation of Li[Li$_{0.1}$Ni$_{0.35}$Co$_{0.14}$Mn$_{0.39}$Sn$_{0.02}$]O$_2$

A cathode active material was prepared in the same manner as in Example 4, except that the starting materials were selected at a different molar ratio of Li, Ni, Co, Mn and Sn to prepare 0.03 mol of Li[Li$_{0.1}$Ni$_{0.35}$Co$_{0.14}$Mn$_{0.39}$Sn$_{0.02}$]O$_2$.

Comparative Example 5

Preparation of
Li[Li$_{0.1}$Ni$_{0.35}$Co$_{0.14}$Mn$_{0.21}$Mo$_{0.21}$Sn$_{0.20}$]O$_2$ A cathode active material was prepared in the same manner as in Example 4, except that the starting materials were selected at a different molar ratio of Li, Ni, Co, Mn and Sn to prepare 0.03 mol of Li[Li$_{0.1}$Ni$_{0.35}$Co$_{0.14}$Mn$_{0.21}$Sn$_{0.20}$]O$_2$.

Comparative Example 6

Preparation of Li[Li$_{0.1}$Ni$_{0.35}$Co$_{0.14}$Mn$_{0.39}$Ti$_{0.02}$]O$_2$

A cathode active material was prepared in the same manner as in Example 7, except that the starting materials were selected at a different molar ratio of Li, Ni, Co, Mn and Ti to prepare 0.03 mol of Li[Li$_{0.1}$Ni$_{0.35}$Co$_{0.14}$Mn$_{0.39}$Ti$_{0.02}$]O$_2$.

Comparative Example 7

Preparation of Li[Li$_{0.1}$Ni$_{0.35}$Co$_{0.14}$Mn$_{0.21}$Ti$_{0.20}$]O$_2$

A cathode active material was prepared in the same manner as in Example 7, except that the starting materials were selected at a different molar ratio of Li, Ni, Co, Mn and Ti to prepare 0.03 mol of Li[Li$_{0.1}$Ni$_{0.35}$Co$_{0.14}$Mn$_{0.21}$Ti$_{0.20}$]O$_2$.

Comparative Example 8

Preparation of Li[Li$_{0.1}$Ni$_{0.35}$Co$_{0.14}$Mn$_{0.39}$Mo$_{0.02}$]O$_2$

Lithium carbonate, nickel acetate, cobalt acetate, manganese acetate, and ammonium molybdate were selected as starting materials. A cathode active material was prepared in the same manner as in Comparative Example 1, except that the starting materials were selected at a different molar ratio of Li, Ni, Co, Mn and Mo to prepare 0.03 mol of Li[Li$_{0.1}$Ni$_{0.35}$Co$_{0.14}$Mn$_{0.39}$Mo$_{0.02}$]O$_2$.

Manufacture of Cathode and Lithium Battery

Example 13

The cathode active material in the form of a powder synthesized according to Example 1 and a carbonaceous conducting agent (Ketjen Black, EC-600JD) were uniformly mixed in a weight ratio of 93:3, and then a polyvinylidene fluoride (PVDF) binder solution was added thereto to prepare a slurry containing the cathode active material, the carbonaceous conducting agent, and the binder in a weight ratio of 93:3:4.

The slurry was coated on a 15 μm-thick aluminum foil and then dried to form a cathode plate. Then, the cathode plate was further dried in vacuum and punched into 12 mm diameter to manufacture a coin cell.

In the coin cell manufacturing process, a metallic lithium electrode was used as a counter electrode, a PTFE separator was used as a separator, and a solution prepared by dissolving 1.3M LiPF$_6$ in a mixed solvent of ethylene carbonate (EC) and diethyl carbonate (DEC) at a volume ratio of 3:7 was used as an electrolyte.

Examples 14-24

Lithium batteries were manufactured in the same manner as in Example 13, except that the cathode active materials synthesized in Examples 2 through 12 were respectively used.

Comparative Example 9

A lithium battery was manufactured in the same manner as in Example 13, except that the cathode active material synthesized according to Comparative Example 1 was used.

Comparative Examples 10-16

Lithium batteries were manufactured in the same manner as in Comparative Example 9, except that the cathode active materials synthesized according to Examples 2 through 8 were respectively used.

Evaluation Example 1

Charge-Discharge Test at High Temperature

Each of the coin cells of Examples 13 through 24 and Comparative Examples 9 through 16 was subjected to one cycle of charging and discharging at 25° C. at a rate of 0.05 C at a constant current of 8.5 mA/g in a voltage range of about 3 to about 4.45V with respect to lithium metal, and then subjected to two cycles of charging and discharging, each at a constant current of 17 mA/g (0.1 C rate) in a voltage range of about 3 to about 4.45V with respect to lithium metal.

Subsequently, each coin cell was subjected to 50 cycles of charging and discharging at 60° C. at a constant current of 170 mA/g (1 C rate) in a voltage range of about 3 to about 4.45V with respect to lithium metal. The results of charging and discharging at high temperatures are shown in Table 1 below. The capacity retention ratios at 60° C. are defined in Equation 1 below.

$$\text{Capacity retention ratio}(\%) = 50^{th} \text{ cycle discharge capacity}/1^{st} \text{ cycle discharge capacity} \times 100 \qquad \text{Equation 1}$$

Evaluation Example 2

Heat Release Rate Measurement Test

Each of the coin cells of Examples 13 through 24 and Comparative Examples 9 through 16 was subjected to one cycle of charging and discharging at 25° C. at a constant current of 8.5 mA/g (0.05 C rate) in a voltage range of about 3 to about 4.45V with respect to lithium metal, and then subjected to two cycles of charging and discharging, each at a constant current of 17 mA/g (0.1 C rate) in a voltage range of about 3 to about 4.45V with respect to lithium metal.

Subsequently, each coin cell was subjected to one cycle of charging at 25° C. at a constant current of 8.5 mA/g (0.05 C rate) until a voltage reaches 4.45V with respect to lithium metal.

Next, the charged coin cell was broken, and then the cathode active material was extracted therefrom and differential scanning calorimeter (DSC) analysis was performed thereon. The DSC analysis results are shown in Table 1 below and FIGS. 1 through 4. In Table 1, the amounts of released heat were calculated using the integral of heat release curves of FIGS. 1 through 4.

TABLE 1

| | Capacity retention ratio [%] | | Heat amount of released [J/g] |
|---|---|---|---|
| Example 13 | 85.58 | Example 1 | 665.7 |
| Example 14 | 81.24 | Example 2 | 476.0 |
| Example 15 | 79.99 | Example 3 | 406.4 |
| Example 16 | 90.37 | Example 4 | 832.5 |
| Example 17 | 95.64 | Example 5 | 589.4 |
| Example 18 | 95.26 | Example 6 | 398.3 |
| Example 19 | 93.88 | Example 7 | 476.0 |
| Example 20 | 97.05 | Example 8 | 472.5 |
| Example 21 | 95.21 | Example 9 | 586.0 |
| Example 22 | 87.40 | Example 10 | 462.9 |
| Example 23 | 92.78 | Example 11 | 412.5 |
| Example 24 | 91.02 | Example 12 | 378.3 |
| Comparative Example 9 | 78.23 | Comparative Example 1 | 1106 |
| Comparative Example 10 | 78.48 | Comparative Example 2 | 620.1 |
| Comparative Example 11 | 74.17 | Comparative Example 3 | 602.8 |
| Comparative Example 12 | 83.89 | Comparative Example 4 | 768.5 |
| Comparative Example 13 | 82.99 | Comparative Example 5 | 1058 |
| Comparative Example 14 | 84.49 | Comparative Example 6 | 560.7 |
| Comparative Example 15 | 84.49 | Comparative Example 7 | 565.7 |
| Comparative Example 16 | 75.34 | Comparative Example 8 | 1157 |

As shown in Table 1, the lithium batteries of Examples 13 through 24 exhibited significantly enhanced cycle characteristics (capacity retention rates) at a high temperature, i.e., 60° C., compared with the lithium batteries of Comparative Examples 9 through 16.

As shown in FIGS. 1 through 4, the cathode active materials prepared according to Examples 1 through 12 that were respectively used in the lithium batteries of Examples 13 through 24 each had a smaller heat release peak and higher temperature at which the heat release peak is present, compared with the cathode active materials prepared according to Comparative Examples 1 through 8 that were respectively used in the lithium batteries of Comparative Examples 9 through 16.

In addition, as shown in Table 1, the cathode active materials of Examples 1 through 12 had lower amounts of released heat than those of the cathode active materials of Comparative Examples 1 through 8. Consequently, the cathode active materials of Examples 1 through 12 had higher thermal stabilities than those of the cathode active materials of Comparative Examples 1 through 8.

As described above, according to the one or more of the above embodiments of the present invention, a lithium battery includes a cathode active material with a novel composition, wherein the cathode active material is substituted with a hetero-element, and thus may have enhanced high-temperature stability and high-temperature cycle characteristics.

It should be understood that the exemplary embodiments described herein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cathode active material comprising a lithium metal oxide represented by Formula 1 below:

$$Li[Li_xCo_bMe_yM'_z]O_{2+d} \quad \text{Formula 1}$$

wherein $x+b+y+z=1$, $0<x<0.33$, $0.14\leq b\leq 0.5$, $0.05\leq z\leq 0.15$, $0\leq d\leq 0.1$, Me comprises at least one metal selected from the group consisting of manganese (Mn), vanadium (V), chromium (Cr), iron (Fe), nickel (Ni), aluminum (Al), and boron (B), and M' comprises at least one metal selected from the group consisting of germanium (Ge), ruthenium (Ru), tin (Sn), niobium (Nb), and platinum (Pt).

2. The cathode active material of claim 1, wherein a part of M' is substituted with Mo.

3. The cathode active material of claim 1, wherein the lithium metal oxide is represented by Formula 2 below:

$$Li[Li_xO_bMe_yM'_{z-w}Mo_w]O_{2+d} \quad \text{Formula 2}$$

wherein $x+b+y+z=1$, $0<x<0.33$, $0.14\leq b\leq 0.5$, $0.05\leq z\leq 0.15$, $0.01\leq w\leq 0.10$, $0\leq d\leq 0.1$, Me comprises at least one metal selected from the group consisting of Mn, V, Cr, Fe, Ni, Al, and B, and M' comprises at least one metal selected from the group consisting of Ge, Ru, Sn, Nb, and Pt.

4. The cathode active material of claim 1, wherein Me comprises Mn and at least one metal selected from the group consisting of V, Cr, Fe, Ni, Al, and B.

5. The cathode active material of claim 4, wherein the amount of Mn is in a range of about 20 to about 50 mol % based on the total moles of $[Li_xMe_yM'_z]$ in the lithium metal oxide of Formula 1.

6. The cathode active material of claim 1, wherein the lithium metal oxide is represented by Formula 3 below:

$$Li[Li_xCo_bMe_yM''_z]O_{2+d} \quad \text{Formula 3}$$

wherein $x+b+y+z=1$, $0<x<0.33$, $0.14\leq b\leq 0.5$, $0.05\leq z\leq 0.15$, $0\leq d\leq 0.1$, Me comprises at least one metal selected from the group consisting of Mn, V, Cr, Fe, Ni, Al, and B, and M" is Ru, or Sn.

7. The cathode active material of claim 6, wherein a part of M" is substituted with Mo.

8. The cathode active material of claim 6, wherein the lithium metal oxide is represented by Formula 4 below:

$$Li[Li_xCo_bMe_yM''_{z-w}Mo_w]O_{2+d} \quad \text{Formula 4}$$

wherein $x+b+y+z=1$, $0<x<0.33$, $0.14 \leq b \leq 0.5$, $0.05 \leq z \leq 0.15$, $0.01 \leq w \leq 0.10$, $0 \leq d \leq 0.1$, Me comprises at least one metal selected from the group consisting of Mn, V, Cr, Fe, Ni, Al, and B, and M" is Ru, or Sn.

9. The cathode active material of claim 6, wherein Me comprises Mn and at least one metal selected from the group consisting of V, Cr, Fe, Ni, Al, and B.

10. The cathode active material of claim 9, wherein the amount of Mn is in a range of about 20 to about 50 mol % based on the total moles of $[Li_xMe_yM''_z]$ in the lithium metal oxide of Formula 3.

11. The cathode active material of claim 1, wherein the lithium metal oxide is represented by Formula 5 below:

$$Li[Li_xNi_aCo_bMn_cM'_z]O_{2+d} \quad \text{Formula 5}$$

wherein $x+a+b+c+z=1$, $0<x<0.33$, $0.05 \leq z \leq 0.15$, $0<a \leq 0.5$, $0.14 \leq b \leq 0.5$, $0.2 \leq c \leq 0.5$, $0 \leq d \leq 0.1$, and M' comprises at least one metal selected from the group consisting of Ge, Ru, Sn, Nb, and Pt.

12. The cathode active material of claim 11, wherein a part of M' is substituted with Mo.

13. The cathode active material of claim 11, wherein the lithium metal oxide is represented by Formula 6 below:

$$Li[Li_xNi_aCo_bMn_cM'_{z-w}Mo_w]O_{2+d} \quad \text{Formula 6}$$

wherein $x+a+b+c+z=1$, $0<x<0.33$, $0.05 \leq z \leq 0.15$, $0<a \leq 0.5$, $0.14 \leq b \leq 0.5$, $0.2 \leq c \leq 0.5$, $0.01 \leq w \leq 0.10$, $0 \leq d \leq 0.1$, and M' comprises at least one metal selected from the group consisting of Ge, Ru, Sn, Nb, and Pt.

14. A cathode comprising the cathode active material of claim 1.

15. A lithium battery comprising the cathode of claim 14.

* * * * *